(12) United States Patent
Liu et al.

(10) Patent No.: US 6,962,193 B2
(45) Date of Patent: Nov. 8, 2005

(54) TUBULAR CATALYTIC AIRCRAFT PRECOOLER

(75) Inventors: Di-Jia Liu, Naperville, IL (US); Belinda S. Foor, Chicago, IL (US); Daniel R. Winstead, Schaumburg, IL (US)

(73) Assignee: Honeywell Interntaional Inc., Morristown, NJ (US)

( * ) Notice: Subject to any disclaimer, the term of this patent is extended or adjusted under 35 U.S.C. 154(b) by 93 days.

(21) Appl. No.: 10/120,057

(22) Filed: Apr. 9, 2002

(65) Prior Publication Data

US 2003/0188850 A1 Oct. 9, 2003

(51) Int. Cl.⁷ .............................. F28F 13/12; F28F 13/18
(52) U.S. Cl. ..................... 165/109.1; 165/133; 165/177; 138/38
(58) Field of Search .............................. 165/109.1, 133, 165/177; 138/38

(56) References Cited

U.S. PATENT DOCUMENTS

| | | | | |
|---|---|---|---|---|
| 2,079,144 A | * | 5/1937 | Appa ........................... | 138/38 |
| 2,709,128 A | * | 5/1955 | Krause ..................... | 165/109.1 |
| 3,847,298 A | | 11/1974 | Hamilton | |
| 3,917,467 A | * | 11/1975 | Toida et al. .............. | 48/197 R |
| 4,134,908 A | | 1/1979 | Steiner et al. | |
| 4,265,275 A | * | 5/1981 | Heller et al. .................. | 138/38 |
| 4,302,490 A | | 11/1981 | Byrd | |
| 4,340,501 A | * | 7/1982 | Davidson ..................... | 165/177 |
| 4,348,360 A | | 9/1982 | Chang et al. | |
| 4,400,309 A | * | 8/1983 | McMahon et al. .......... | 502/337 |
| 4,559,998 A | * | 12/1985 | Counterman ............. | 165/109.1 |
| 4,665,973 A | | 5/1987 | Limberg et al. | |
| 4,670,103 A | * | 6/1987 | Holl ........................ | 165/109.1 |
| 4,691,761 A | * | 9/1987 | Kito et al. .................... | 138/38 |
| 4,905,249 A | * | 2/1990 | Turner .......................... | 372/59 |
| 5,151,022 A | | 9/1992 | Emerson et al. | |
| 5,252,299 A | | 10/1993 | Retallick ..................... | 422/174 |
| 5,279,261 A | * | 1/1994 | Moscone ................... | 122/17.2 |
| 5,307,867 A | * | 5/1994 | Yasuda et al. ........... | 165/109.1 |

FOREIGN PATENT DOCUMENTS

JP                03117896 A  *  5/1991

* cited by examiner

Primary Examiner—Leonard R. Leo
(74) Attorney, Agent, or Firm—Oral Caglar, Esq.

(57) ABSTRACT

A tube assembly for cooling an incoming fluid stream and destroying pollutants contained therein comprises a tube with a catalytic coating on its inner wall and an arrangement for disrupting laminar flow of the fluid stream as it transits the tube, thereby causing turbulence which increases mass transfer between the gas phase and the catalyst-coated inner surfaces. One embodiment comprises an axially inserted turbulator that is segmented by one or more axially directed cuts, each segment rotated by an offset angle with respect to an adjacent segment, and optionally coated with the catalytic coating. Another embodiment comprises sets of opposed dimples, each set separated from its adjacent set by a linear distance and an axial angle. Such tube assemblies may be advantageously employed in aircraft environmental control systems for conditioning cabin air.

23 Claims, 7 Drawing Sheets

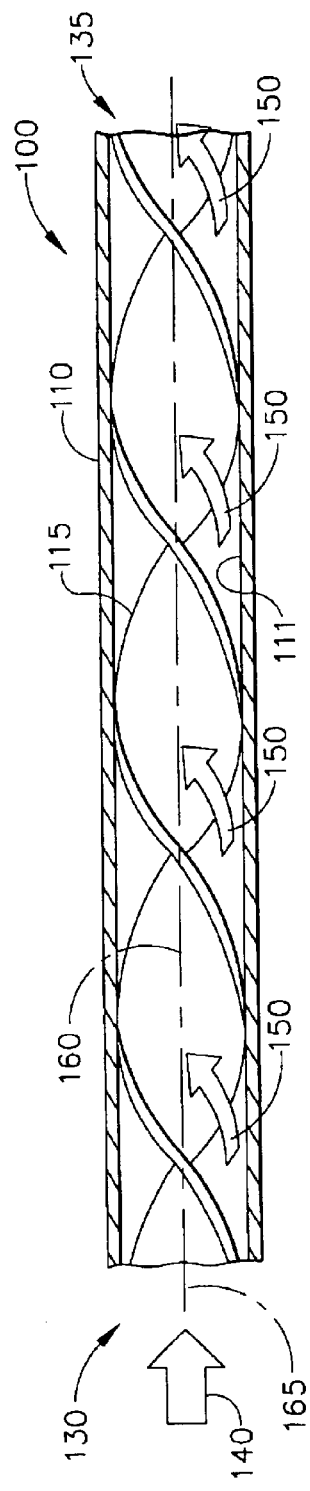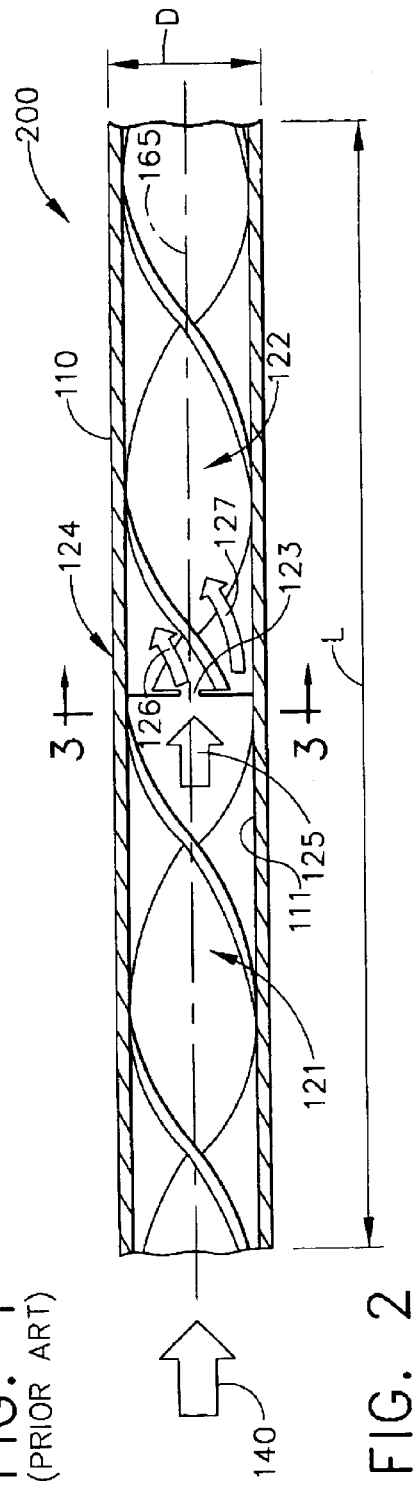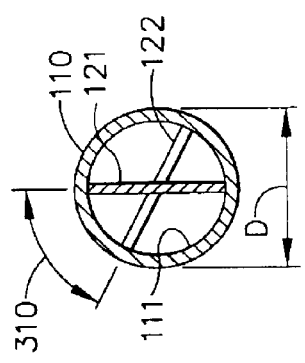
FIG. 1 (PRIOR ART)
FIG. 2
FIG. 3

TUBULAR CATALYTIC AIRCRAFT PRECOOLER

BACKGROUND OF THE INVENTION

The present invention generally relates to air purification systems for use in aircraft and, in particular, to environmental control systems (ECS) for use on aircraft to remove pollutants from the ambient air for cabin usage.

A commercial aircraft is generally equipped with an environmental control system (ECS) which provides fresh, conditioned air to the on-board passengers. A typical ECS receives compressed air, or bleed air, from an aircraft gas turbine engine and delivers it to the cabin. This bleed air after expansion has a temperature in the range of 200°–500° C. It is typically directed to a primary heat exchanger, or precooler, where it is further cooled to a temperature in the range of 100°–150° C. From the precooler, this warm bleed air is then sent to an air conditioner that performs a final cooling function and delivers fresh air to the aircraft cabin. A remediation system, such as a stand-alone catalytic converter, is usually interposed between the precooler and the air conditioner, to remove the pollutants from the bleed air from the gas turbine engine which may affect passengers' safety and comfort level.

One such pollutant is ozone, which is present at high concentration levels in the atmosphere at altitudes of 20,000 feet or more. Ozone, even at low levels of concentration, will cause irritation of the respiratory systems of passengers and must therefore be removed. A stand-alone catalytic converter for the destruction of ozone is generally installed to convert over 90% of $O_3$ to oxygen. This stand-alone catalytic converter, though effective, generally requires additional hardware, such as monolithic substrate, shells and pipes, which results in an increase of weight, volume and pressure drop, all of which are undesirable in an aircraft ECS application. Another type of pollutant consists of low level hydrocarbon fumes which occasionally enter the ECS system through the air intake. Hydrocarbon fumes cause odor in cabin air that therefore must be abated for passenger's comfort. To catalytically decompose hydrocarbon fumes into harmless carbon dioxide and water usually requires a reaction temperature above 200° C. The operating temperature of the stand-alone catalyst unit placed downstream of precooler is generally too low to accomplish this.

One approach that addresses these problems is to integrate the catalytic pollutant removal function of the stand-alone catalytic converter with the cooling function of the precooler to form a catalytic precooler. The catalytic precooler combines the functionality of heat transfer and pollutant destruction in a single unit that reduces the weight, volume and pressure drop for the ECS. The precooler, being the primary heat-exchanging device, receives air at higher temperatures than the air received by the downstream stand-alone catalytic converter, but higher gas temperatures are preferred for the catalytic destruction of both ozone and hydrocarbon pollutants. U.S. Pat. No. 4,665,973, to Limberg et al. and U.S. Pat. No. 5,151,022, to Emerson et al. both describe such devices.

Nevertheless, such catalytic converters have problems. First, the incoming air is directed through channels having a pollutant-destroying catalyst interposed. Under high flow space velocity, the incoming air tends to assume a laminar flow along the inner surfaces of the channel and thus has limited interaction with the catalyst on the surface of the wall. The design of the catalytic precooler should ensure sufficient mass transfer between the gas phase and the catalyst-coating surface without causing substantial increase of pressure drop. This is particularly important for a tubular precooler where, because of laminar flow, mass transfer is often insufficient to achieve catalytic destruction levels in excess of 90% for pollutants. Second, the catalytic coating should have high activity; increased tolerance to thermal shock; increased resistance to particle abrasion; increased resistance to deactivation by gas phase catalyst poisoning and dust; and long service life. Finally, the catalytic coating should have sufficient heat transfer capability in order to maintain the cooling function of the precooler.

Thus, as can be seen, there is a need for a catalytic precooler for use in an aircraft ECS which weighs less than combination of a separate precooler and catalytic converter of prior art systems; has better catalytic activity, thermal shock resistance, and particle abrasion resistance than prior art systems; and exhibits an improved mass transfer between the gas phase and the catalyst-coating surface to achieve catalytic destruction levels of pollutants in excess of 90% without causing substantial increase of pressure drop.

SUMMARY OF THE INVENTION

An apparatus and method is provided for cooling an incoming fluid stream and removing pollutants therefrom. A tube assembly is provided, which comprises a tube having a means for disrupting laminar flow of the incoming fluid stream as it flows through the tube in order to enhance the interaction between a catalytic coating and the incoming fluid stream for the destruction of pollutants contained in the fluid stream. Such a tube assembly is advantageously deployed as an aircraft catalytic precooler for cooling and removing pollutants from incoming bleed air from the aircraft engine compressor and delivering conditioned air to the cabin area.

In one aspect of the invention, the tube assembly comprises a tube through which an axially directed turbulator is provided to disrupt laminar flow of the incoming fluid stream, so as to increase interaction of the catalytic coating with the incoming stream for pollution destruction. The turbulator is comprised of a plurality of elongate strips joined along a central turbulator axis and twisted about the turbulator axis. The turbulator is divided into a plurality of segments separated by an offset area, the offset area being formed by axially directed cuts made in each of the strips; the segments are then rotated by an offset angle with respect to one another. When the incoming fluid stream enters the offset area, turbulence is created by the offset segment, which disrupts laminar flow of the incoming fluid stream formed along the space between the inner tube walls and the turbulator.

In another aspect of the invention, the tube assembly comprises a tube having sets of opposed dimples axially impressed in the tube walls, each set being rotated by a dimple angle with respect to the adjacent set. The dimples disrupt laminar flow of the incoming fluid stream along the interior wall of the tube to increase interaction of the catalytic coating with the incoming stream for pollution destruction. A segmented turbulator is not required since the dimples function to disrupt laminar flow.

In another aspect of the invention, a method of catalytically destroying pollutants in an incoming heated fluid stream is provided, where the method comprises the steps of directing the fluid stream through a closed channel having an interior surface and an exterior surface, in order to establish a heated incoming flow along the interior surface; providing a catalytic coating on the interior surface to catalytically destroy pollutants contained in the fluid stream; disrupting the laminar flow of the fluid stream to produce turbulence to enhance mass transfer between the fluid stream and the catalytic coating; and cooling the fluid stream passing through the channel. The laminar flow of the fluid stream may be disrupted by either a turbulator that may optionally be coated with the catalytic coating or by impressing dimples in the walls of the channel.

In another aspect of the invention, the tube assemblies are employed in a bundle as a portion of a catalytic precooler for use on an aircraft. The catalytic precooler receives bleed air from the aircraft engine and delivers conditioned air for use within the cabin area of the aircraft. The precooler comprises the bundle of tube assemblies which conditions the bleed air by cooling the incoming bleed air and removing pollutants from the bleed air; a means for directing cool ram air across the bundle; a means for directing hot bleed air to the entry end of the tube assemblies; and a means for directing the cooled air leaving the tube assemblies to a secondary air conditioning system that supplies air to the cabin area.

These and other features, aspects, and advantages of the present invention will become better understood with reference to the following drawings, description, and claims.

BRIEF DESCRIPTION OF THE DRAWINGS

FIG. 1 gives a longitudinal cross-sectional view of a tube containing a turbulator without segmentation as generally known in the art;

FIG. 2 gives a longitudinal cross-sectional view of a tube assembly containing an offset turbulator segmented by a single set of axially directed cuts according to an embodiment of the invention;

FIG. 3 gives an axial cross section of the tube assembly to better illustrate the offset angle according to an embodiment of the invention;

DETAILED DESCRIPTION OF THE INVENTION

Figure 4:
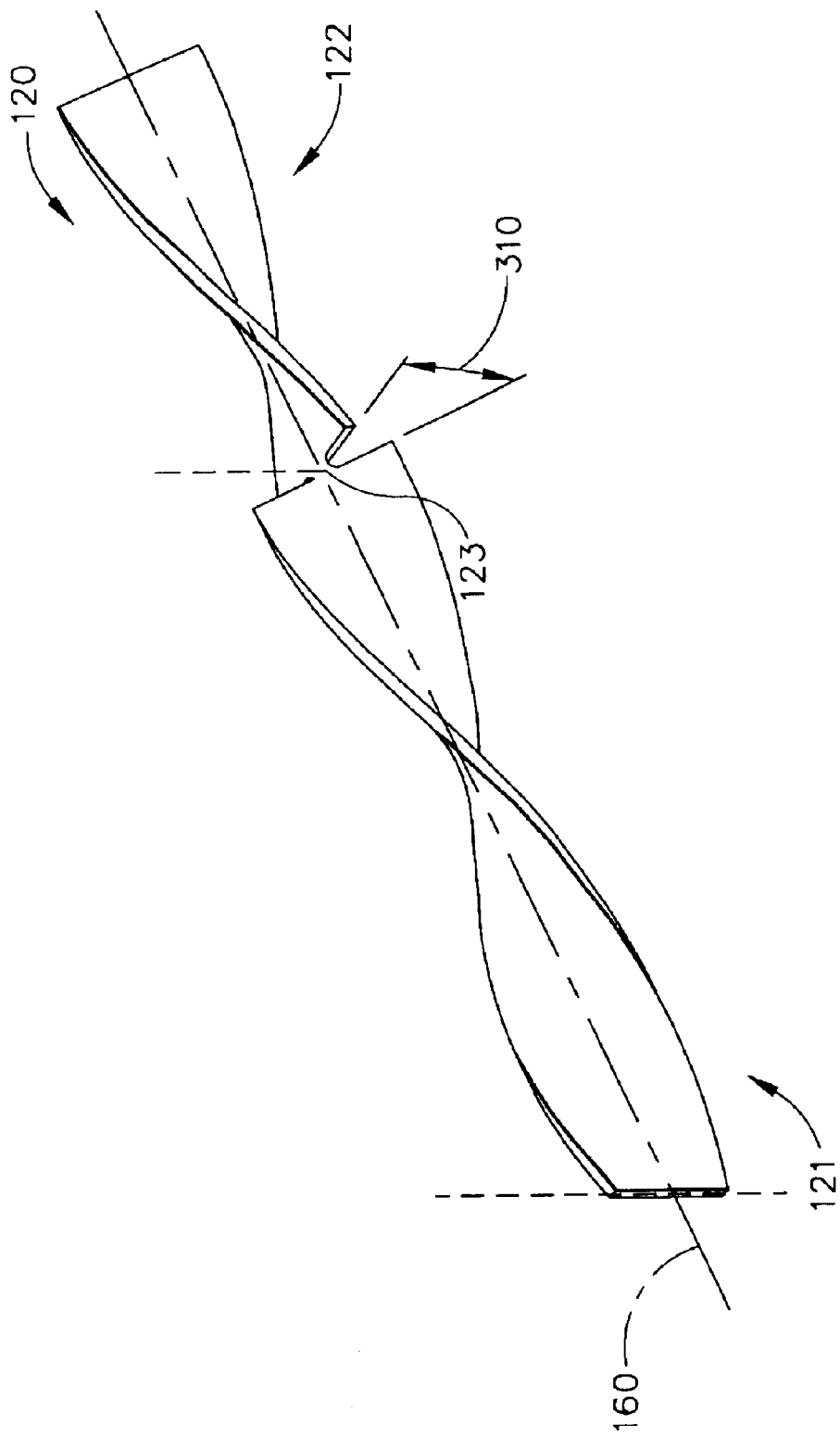
FIG. 4 gives a perspective view further illustrating the segmentation of the turbulator according to an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

An apparatus and preparation method will now be described for a new and novel tube assembly with a catalytic coating for destruction of pollutants contained in an incoming fluid stream and a turbulence-producing arrangement within the tube assembly for increasing the interaction between the gas phase and the catalytic coating. A plurality of such tube assemblies may be advantageously employed in a bundle comprising a component of a catalytic precooler which receives heated air as the incoming fluid stream, as might be produced by a turbine engine. Such a catalytic precooler may be used in an environmental control system (ECS) for conditioning air within enclosed compartments occupied by humans such as, for example, aircraft cabins or armored military vehicles. As shown in FIG. 1, the use of a spiral, or non-segmented, turbulator has been disclosed in the non-analogous prior art, as for example in U.S. Pat. No. 4,134,908, to Steiner et al.; however, the prior art does not teach or show the use of a segmented turbulator of the kind which shall be presently described. Furthermore, the prior art does not teach or show the use of a catalytic coating with enhanced catalytic surface area for all interior surfaces of the tube assembly having a spiral turbulator inserted therein, where the tube assembly is according to the prior art shown in FIG. 1 or according to the invention. Finally, the prior art does not teach or show the use of the tube assembly containing either a non-segmented or a segmented turbulator for the catalytic destruction of pollutants in a moving fluid stream as described herein.

A tube assembly constructed according to the principles of the invention has low pressure drop, high catalytic conversion efficiency, and high thermal shock and abrasion resistance. The interior surfaces of the tube assembly are coated with a high surface area catalytic material, such as manganese and nickel oxide and precious metals supported by metal oxide, capable of catalytic destruction of air pollutants such as ozone, carbon monoxide, and hydrocarbons. The catalytic material can also be comprised of highly dispersed transition metal oxides, such as manganese oxide and nickel oxide, or highly dispersed precious metal microcrystallites supported by high surface area refractory metal oxides, such as alumina, silica, or titania, capable of catalytic destruction of aforementioned air pollutants. The catalytic coating may be applied to the interior wall of the tube, the turbulator, or both. The segmented turbulator according to the invention not only provides maximum mass transport between the gas phase and the inner surface of the tube, but also provides more inner surface area for such mass transport through the use of the turbulator, at minimum pressure drop across the entry and exit ends of the tube assembly. The invention substantially improves the overall efficiency of the tube assembly for catalytic mass transfer and heat transfer, as well as the lifetime of catalytic activity. The catalytic coating is formed generally of a catalytically active metal oxide slurry containing organosiloxane as a binder, which yields mechanically strong yet porous layer after a calcination and caustic etching process. The catalytic coating can also be formed of a high surface area refractory metal oxide slurry containing organosiloxane as binder, followed by calcination and catalyzing processes.

FIG. 1 gives a cross-sectional view of a simple non-segmented tube assembly 100 constructed according to the prior art in a non-analogous application. Tube assembly 100 comprises tube 110 with a turbulator 115 inserted therein. For illustrative purposes, tube 110 is shown as being circular in cross-sectional area. Although any concave cross-sectional area for the tube, such as, for example, elliptical, hexagonal, or rectangular, may be used without departing from the scope of the invention, a tube 110 having a circular cross-sectional area is preferable. The airflow 140 enters from the entry end 130 of tube 110, where it is divided into two portions and guided through tube 110 by the surface of the turbulator 115, as indicated by the arrows 150. Turbulator 115 is constructed from two strips of ductile metal joined along an edge of each strip along the turbulator axis 160 and then, while maintaining the strips in the same plane, continuously twisting the strips about turbulator axis 160 that also generally coincides with the central axis 165 of tube 110.

In an embodiment of the invention shown in FIGS. 2, 3, and 4, tube assembly 200 is shown with segmentation according to the invention. Turbulator 120 is shown as comprising a plurality of metal strips connected along one edge along turbulator axis 160. Turbulator 120 is segmented by axially clipping each strip to form a first turbulator segment 121 and a second turbulator segment 122, and leaving a thin connecting portion 123 remaining between the segments along the turbulator axis 160. FIGS. 2 and 4 show preferably all strips being axially clipped, but at least one strip should contain such an axial cut. As best shown in FIGS. 3 and 4, first turbulator segment 121 is then rotated with respect to the second turbulator segment 122 by offset angle 310 to create a surface discontinuity or offset region 124. The value of offset angle 310 is preferably between 15° to 90°, and most preferably between 60° to 90°. This segmentation can be repeated throughout the entire length of the turbulator to form a plurality of segments separated by offset regions. Each segment may be further defined by its twist angle, or the angle by which the ends of the segment are rotated with respect with each other. The twist angle may be 0° for a completely flat segment, or any other positive angle including angles of greater than 360°.

Airflow 140 entering tube 110 tends to develop a laminar flow pattern along the inner tube wall 111 and the surface of turbulator 120. When the airflow 125 reaches an offset region 124, the flow path will experience a sudden change in direction and the laminar flow pattern is thus disrupted. Airflow 125 flowing along one side of the first turbulator segment 121 will be split by offset region 124 into two split airflows 126, 127 and forced to mix with the airflow (not shown) flowing along the other side of first turbulator segment 121 as all airflows enter second turbulator segment 122, as is shown in FIG. 2. This disruption creates turbulence and changes the laminar flow pattern, resulting in improved interaction between the gas comprising the airflow, the surface of turbulator 120, and the inner tube wall 111. This turbulence is recreated at every offset region 124 and thus promotes significantly enhanced surface and gas phase interaction, as compared with straight tubing or with straight tubing containing an unsegmented turbulator.

Turbulator 120 improves mass transfer and may have a major impact on the pressure drop through tube assembly 200. In addition to the tubing length L and inner diameter D, the overall pressure drop between the entry end 130 and the exit end 135 of tube 110 depends upon a number of factors, such as the number of offsets, the twist angle within each segment at given length l, the offset angle 310, and the thickness of the turbulator. The twist angle for a segment is normally from 90° to 180°. The preferred ratio l/D of the segment length l to the tubing diameter D should be larger than four for a preferred twist angle of 180°. The edges of the turbulator are preferably tight-fit within the inner tube wall 111, to form two channels for the incoming airflow. The turbulator is fixedly attached to tube 110 by preferably inserting the turbulator into the tube and then anchoring the turbulator edges to the inner tube wall 111 by metal brazing. Alternatively, the turbulator can be fixedly attached to the tube by inserting the turbulator therein and fixedly attaching the ends of the turbulator to the entry end and the exit end of tube 110 by means well known in the art, such as welding, brazing, rivets, and the like.

Although the construction of the turbulator is given in terms of two elongate rectangular strips in the same plane (before twisting) for simplicity of explanation, other turbulator configurations are possible without departing from the scope of the invention. Multi-strip configurations are possible. For example, a turbulator assembly could be constructed of four metal strips joined at one edge of each strip along a common axis, or centerline, and separated from adjacent strips by an angle of 90°, thus forming an X-shaped cross-section having four air pathways instead of two. The ends of the assembly may then be twisted in opposite directions to form a series of twists therein. The assembly may then be optionally segmented in the manner described herein to form offset regions. The offset angle between each segment can range from 15 to 45°. Such turbulator assemblies serve to increase the internal surface area available for catalytic interaction with the incoming airflow but have the disadvantage of being more complicated to construct and potentially causing higher pressure drop.

The turbulator 120 according to present invention can be made with any lightweight material that meets the temperature and mechanical requirements for the tube assembly. The turbulator 120 is preferably composed of a thin sheet of metal foil, where the metal may be aluminum, titanium, stainless steel, or equivalent alloys. Alternatively, turbulator 120 can be made of ceramic materials cast into a twisted, or spiral, shape according to the invention and which meet temperature, weight, and mechanical requirements. The surfaces of turbulator 120, the inner tube wall 111, or both, may be coated with a catalyst material with high specific catalytic surface area.

Figure 5:
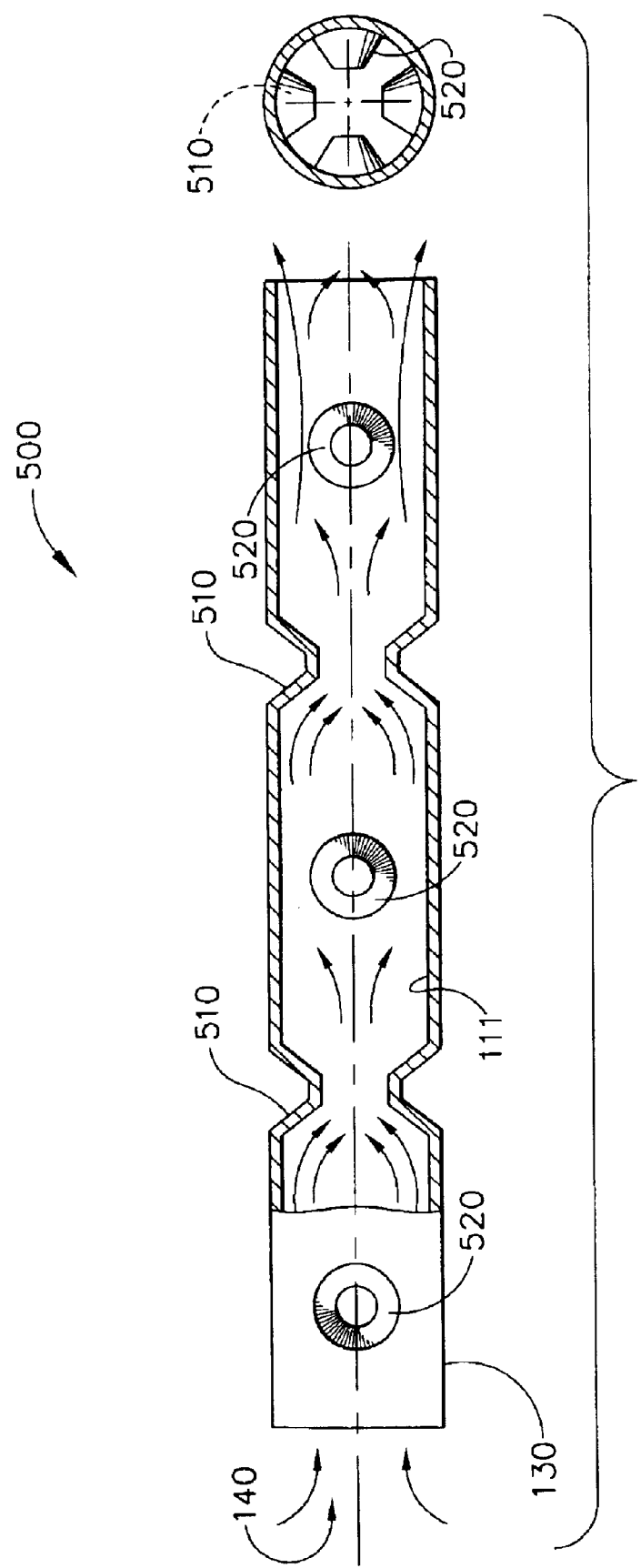
FIG. 5 gives a cross-sectional view of a dimpled tube assembly according to another embodiment of the invention.

Another embodiment of the present invention consists of tube assembly 500 having dimples impressed in its surface rather than a centrally inserted turbulator, as shown in FIG. 5. Sets of opposed dimples 510, 520 are impressed into the tube walls. In the embodiment shown, each set of opposed dimples 510, 520 contains two dimples, each impressed in the tube wall opposite each other, or 180° apart. However, each set of opposed dimples 510, 520 may contain one or more such dimples as a logical group spaced around the circumference of the tube wall in generally the same cross-sectional region. Each set of opposed dimples 510 is axially rotated with respect to an adjacent set of opposed dimples 520 by an angle, preferably 90° when a set contains two dimples. This axial separation produces a staggered effect that increases turbulence. A set of opposed dimples 510 is linearly separated from an adjacent set of opposed dimples 520. As the heated airflow 140 enters the entry end 130, the laminar flow pattern along the inner tube wall 111 is disrupted and turbulence is formed when airflow passes through a cross-sectional region containing a set of opposed dimples 510. The mass transport between the gas phase and the inner tube wall 111, which has a catalytic coating, is greatly improved thereby and the catalytic efficiency of the tube assembly 500 is thus enhanced. The potential advantage of, using the dimpled tubing approach is its manufacturing simplicity, which does not involve the fabrication and insertion a segmented turbulator. The embodiment represented by tube assembly 500 has been shown to produce less pressure drop compared tube assembly 200 having an inserted turbulator.

Figure 6:
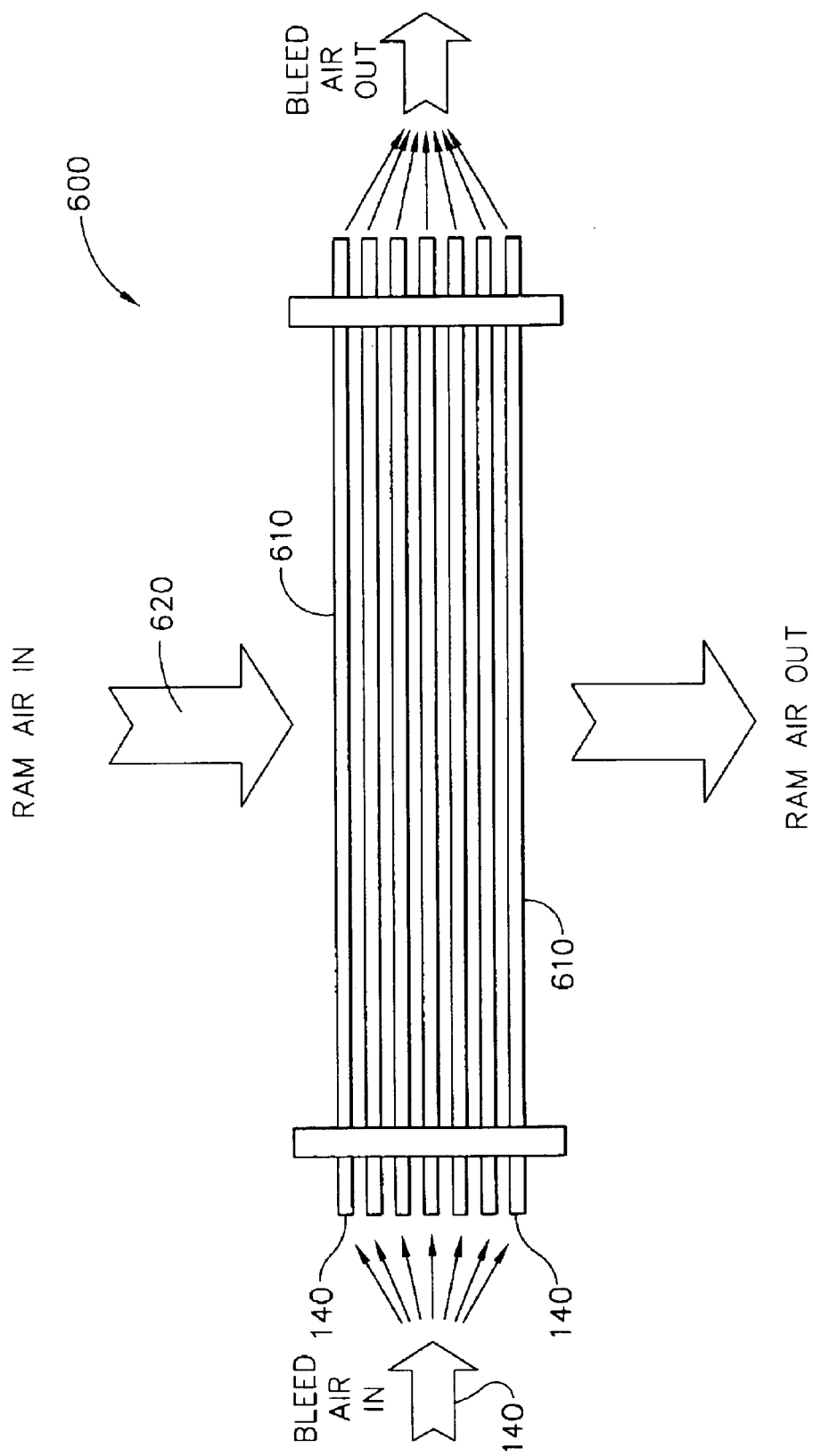
FIG. 6 gives a schematic representation of a tubular aircraft catalytic precooler according to an embodiment of the invention.

For an aircraft ECS application as depicted in FIG. 6, the tubular precooler 600 usually contains a bundle of tube assemblies 610 in a parallel configuration, as is shown in FIG. 6. Airflow 140 consisting of incoming hot bleed air from the turbine engines is divided and directed to the entry end 130 of each tube assembly 610. The cooling function of tubular precooler 600 is provided by directing cool ram air 620 along the outer surface of the tube assemblies 610. The pollutant removal function is provided by forming a catalytic coating on the inner tube walls 111 of the tube assemblies 610 in tubular precooler 600. Pollutants such as ozone, carbon monoxide, or hydrocarbons in the hot bleed air are catalyzed on the surface of the catalytic coating into environmentally benign substances. For example, $O_3$ is decomposed into $O_2$, and carbon monoxide and hydrocarbons catalytically react with oxygen in the bleed air to form $CO_2$ and water.

According to another embodiment of the present invention, the individual tubes within the tube assemblies 610 have different turbulator configurations according to their position within the bundle. These differences may be in number of offsets, the twisting angle, or offset angle, or any combination of these aspects. These different turbulator configurations result in differences in pressure drop between the entry end and exit end of differently configured tube assemblies 610. This difference in pressure drop may be used to compensate the uneven flow distribution at the entrance of the tube assembly 610. For example, the overall diameter of the bundle may be significantly larger than the orifice of the bleed air entrance. The tube assemblies in the center portion of the bundle may be presented with higher incoming flow pressure than the tubes in the outer edges of the bundle. By changing the turbulator configurations, i.e. changing the number of offsets, twisting angles, or offset angles, a higher pressure drop can be generated for the tube assemblies in the center portion of the bundle to achieve a uniform flow distribution through the bundle as a whole.

Figure 7:
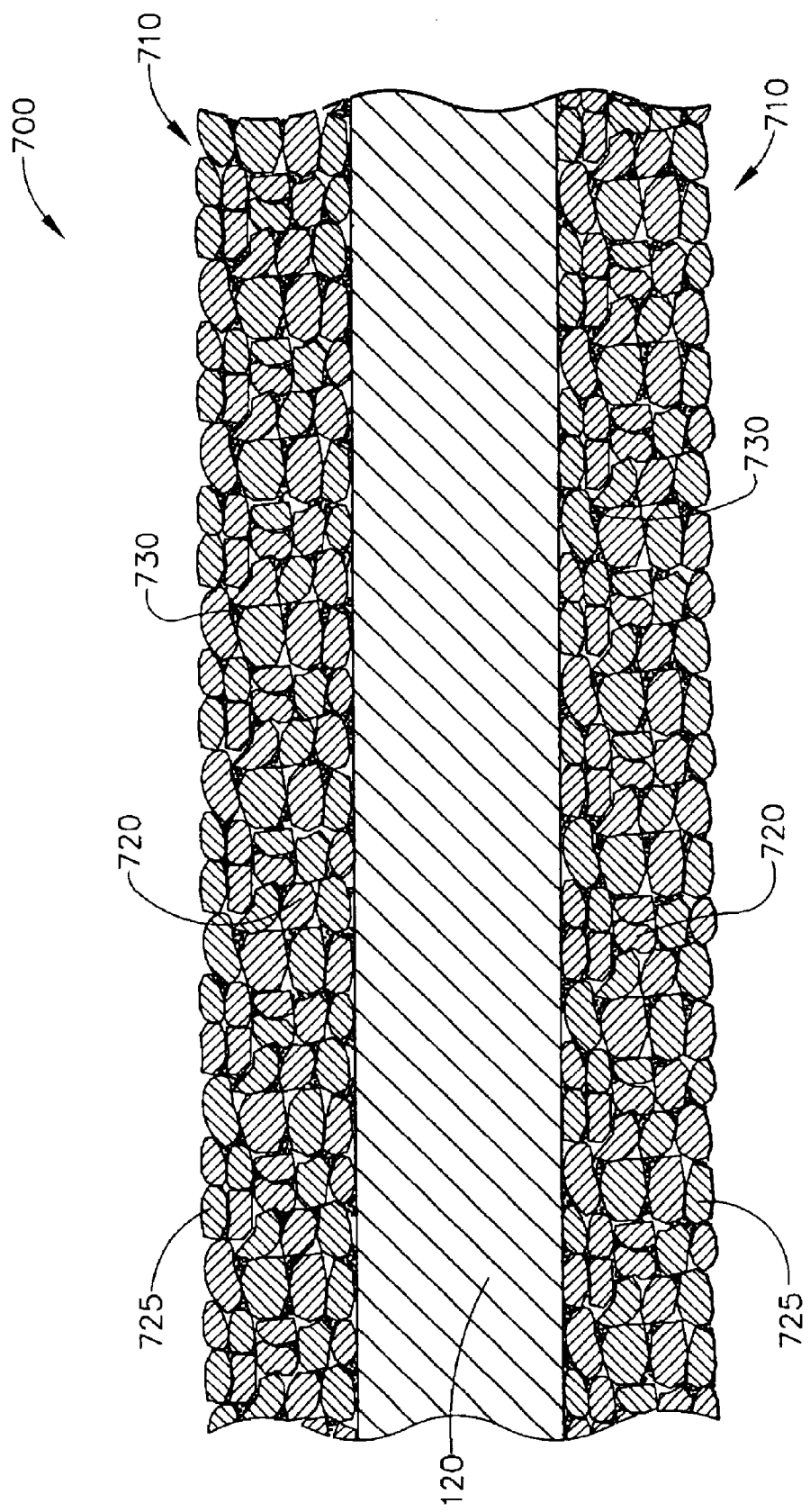
FIG. 7 gives a detailed cross-sectional description of the composition of the catalytic coating according to an embodiment of the invention.

Referring now to FIG. 7, which microscopically shows a cross sectional view 700 of the catalytic coating 710 on the surface of the turbulator 120, the catalytic coating composition and process will now be described. The process of the catalytic coating involves the steps of cleaning, slurry preparation, coating, and activation/catalyzing.

The surfaces to be coated with the catalyst, i.e. the inner tube walls 111, the turbulator 120, or both, may be thoroughly cleaned to ensure adherence of the catalytic coating. During the cleaning process, the surfaces are thoroughly washed and degreased with industrial grade detergent solution, followed by rinsing and drying.

A catalyst slurry was prepared by mixing a catalytically active material 720 with a solvent and binder 730. In the present invention, catalytically active material 720 refers to those materials that can promote the catalytic destruction of the air pollutants under the precooler operating conditions. For example, metal oxides such as manganese oxide ($MnO_2$) and nickel oxide (NiO) can be used for the destruction of ozone and carbon monoxide. Pre-catalyzed metal oxide made by impregnating precious metal over refractory metal oxides, for example, $Pt/Al_2O_3$ or $Pd/Al_2O_3$, can also be used. These catalytically active materials are generally in the form of fine powders having a particle size typically in the range of 100 to 600 mesh. They can either be acquired directly from a commercial source such as Carulite from Carus Chemical Company, or prepared through catalyzing the high surface area alumina with precious metal precursors through the wet incipient method, which is well known in the art. Alternatively, the inert refractory metal oxides 725 with high surface area, such as alumina or silica, can be used in place of the catalytically active material 720 during the slurry preparation while the catalytically active ingredients can be added in the final step of catalyzing/activation process to convert the inert metal oxides 725 to catalytically active material 720. The preparation of the slurry in the present invention uses organosiloxane resin as binder 730 and organic compounds as solvents. Solvents such as toluene, xylene, benzene, and isopropanol are preferred, and toluene and xylene are the most preferable. The binder, the solvent, and either the catalytically active material or the metal oxide, or both, are physically mixed and then ball milled to form the slurry mixture. The slurry thus prepared is used to coat the inner surface of the tube assembly. This coating can be accomplished after the turbulator is installed inside of the tube, or alternatively, the coating can be performed separately to the tube and to the turbulator, followed by insertion of the pre-coated turbulator into the tube. The coating process usually involves immersing the tube and/or turbulator in the slurry under vacuum, removing the coated parts from the slurry tank, and blowing away the excess slurry with an air-knife. Alternatively, slurry can be applied to the surfaces of the tube and/or turbulator by spraying, painting, deposition, or other such methods well known to the art. After the surfaces are coated with the slurry, the slurry may be dried and cured, followed by calcination in flowing air to remove the organic components in the slurry.

If the metal oxide in the slurry does not contain catalytically active materials, such as, for example, alumina, silica, or aluminum silicate, a catalyzing process is required to add the catalytically active ingredient to the metal oxide in order to create the pollutant destruction function on the tube and turbulator surfaces. The catalyzing process usually involves impregnating the coating material with the catalyst precursor solution, followed by calcination in air or reduction in reducing gas such as hydrogen using methods that are well known in the art. The type of the catalyst used depends on the design of the functionality for the catalytic precooler. A trimetallic catalyst formulation is preferred for the destruction of ozone in the bleed air through a catalytic precooler. The catalyst precursor solution used in the trimetallic catalyst formulation contains one precious metal and two transitional metal ingredients. In the preferred embodiment, the precious metal precursor may be palladium nitrate and the transition metal precursors may be manganese nitrate and nickel nitrate. The metal weight percent in the precursor solution for the precious metal should range from 0.5 to 6 wt. %, while the metal weight percent in the precursor solution for each of the transition metals should range from 1 to 12 wt. %. The preferred weight percentage ranges from 1 to 4 wt. % for the precious metal and 3 to 8 wt. % for the transition metals in their precursor solutions, respectively. As will be demonstrated in the examples, tubing assemblies prepared with this catalyst formulation have been found to have improved fresh catalyst performance at both low and high operating temperatures, as well as improved resistance to the catalyst poisons.

When the metal oxides in the coating slurry are already catalytically active or contain catalytically active materials, such as Hopcalite or precatalyzed $Pd/Al_2O_3$ or $Pt/Al_2O_3$, an optional activation step may be used in place of the catalyzing step after the slurry coating and curing. In an embodiment of the present invention, the activation step involves removing the excess binder material from the catalyst coating to expose more of the catalytic active surface for gas phase interaction, thus improving overall catalyst activity and lifetime. Caustic solutions, such as concentrated ammonium hydroxide or sodium hydroxide, are preferably used in an embodiment of the present invention to "itch" away the silica formed on the outer surface of the catalyst in the coating binder matrix, since these caustic solutions have little or no interaction with the catalyst materials. The etching process comprises the immersion of the coated tube assembly in a tank containing the caustic solution for a brief period of 0.5 to 10 minutes at a temperature ranging from 20° to 80° C. After the etching process, the surface of the coating may be rinsed, preferably with deionized water. This is followed by drying and optional high temperature treatment in either air or a reducing gas such as hydrogen, depending on the type of catalyst in the coating.

In another embodiment of the catalyst preparation process, an additional catalyzing step is performed after the washcoating, calcination, and activation steps for the coated surface prepared from the slurries already containing a catalytically active material. The additional catalyst may thus be added over the existing catalytically active material in the coating, as well as over the binder portion of the coating. For example, after a slurry containing Hopcalite and silicone resin is coated and calcined over the tube surface, an additional layer of catalyst, such as palladium, can be added over Hopcalite/silica surface which is formed from the silicone resin during the calcination stage. The new catalyst addition can be achieved through direct impregnation of the catalyst precursor solution followed by drying and calcination, or overcoating another layer of slurry containing the new catalyst material followed by calcination and activation steps.

EXAMPLE I

A segmented turbulator was made with a stainless steel strip with 0.2" in width 12" long and 0.0025" thick. Eight segments each having a length of 1.5" were formed. The twist angle a within each segment was 90° while the offset angle between segments was also 90°. The segmented turbulator was then inserted into a thin wall, stainless steel tube with length of 12", to form Tube A according to one embodiment of the tube assembly. Separately, a similar tube was dimpled by axial compression to a depth of 0.04" to form sets of two opposed dimples along the length of the tube. Eight sets of dimples were formed with linear separation of 1.5" between adjacent sets, to form Tube B according to another embodiment of the tube assembly. Finally, another tube 12" long and having no modification was used as a reference, to form Tube C. Tubes A, B, and C were washed by industrial detergent solution, followed by drying in ambient air.

EXAMPLE II

An $Al_2O_3$ slurry was made by mixing 15% Boehmite (Versal alumina 250 by LaRoche Industries, Inc.), 40% SR 125 synthetic silicone resin (GE Silicones) balanced with toluene. The mixture was then ball milled for two hours and then further diluted with additional toluene to form a slurry with a viscosity of 40 centipose. The interiors of Tubes A, B, and C in Example I were then washcoated by first filling the tubes with slurry under vacuum, followed by removing the excess slurry through an air-knife. The coated tubes were subsequently subjected to drying, curing, and calcination at 550° C. for two hours in dry airflow. The tubes were then dipped in a metal nitrate solution containing 1.5 wt % of palladium and 4 wt. % of nickel, followed by removal of excess liquid, drying, and calcination at 475° C. for two hours. The catalyzing process was then repeated once more.

EXAMPLE II

Catalytic Ozone Destruction Test

Figure 8:
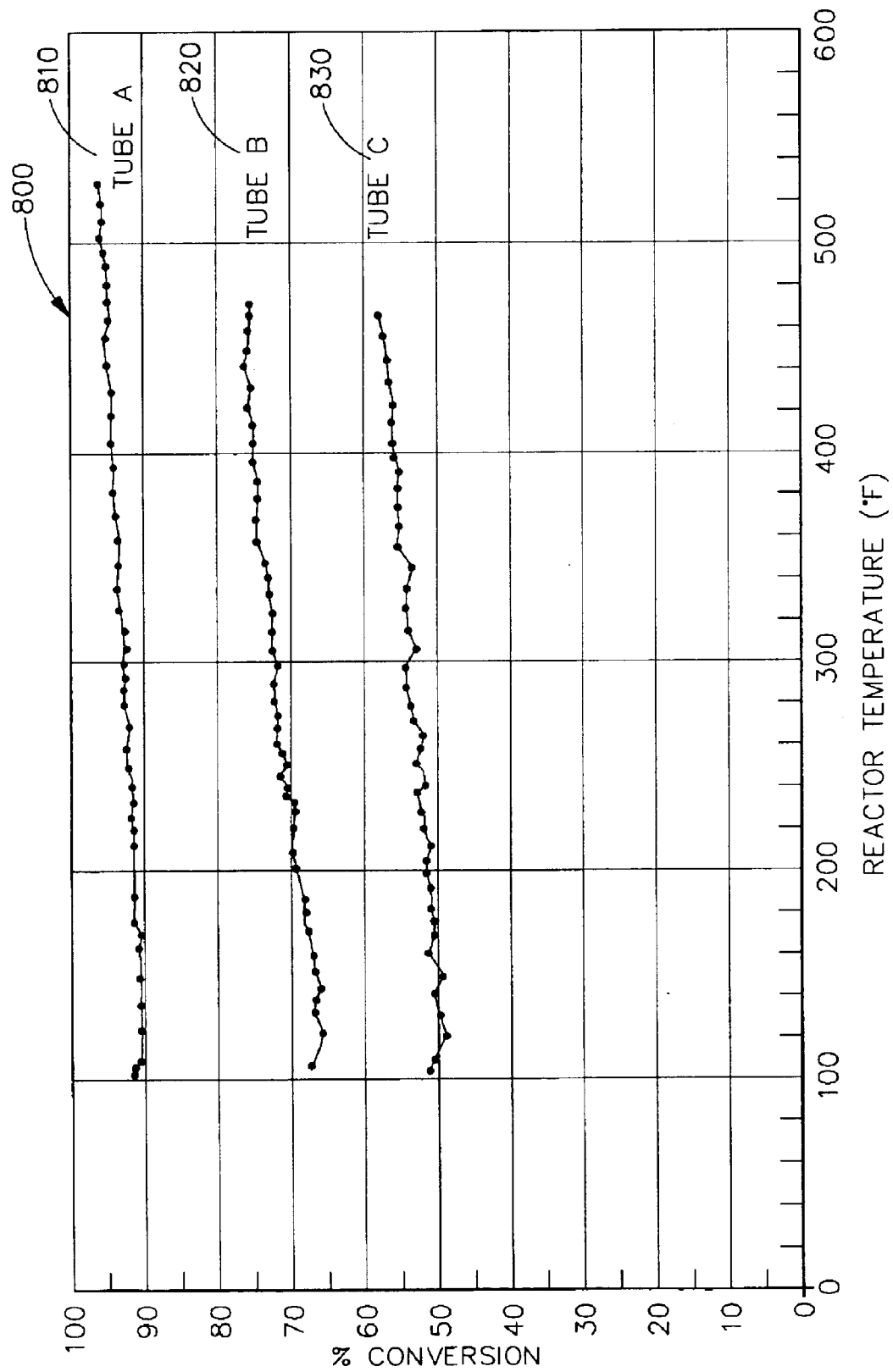
FIG. 8 shows a graph of ozone conversion efficiency as a function of the incoming airflow temperature for the three different tubular configurations in Example III according to an embodiment of the invention; and, FIG. 9 shows a graph of ozone conversion efficiency as a function of temperature for the tubular configurations given in Example IV according to an embodiment of the invention.

Catalyzed tubes A, B, and C prepared according to Example II were mounted separately inside of the reactor of a test bed in which an air flow containing ozone with concentration of 2.4 ppm was directed towards the entry end of the catalyzed tubes. The flow rate was maintained at 14 standard liter/min while the reactor temperature was raised from ambient to 600° F. Simultaneously, the ozone concentrations upstream and downstream of the reactor were measured by using two ozone monitors. The level of conversion, calculated as the ozone concentration reduction at the exit ends of the tube assemblies over that of the respective entry ends, was seen as a function of the reactor temperature and plotted in graph 800 shown in FIG. 8. As can be seen in graph 800, the plot for Tube A 810 had the best ozone conversion efficiency (>90%) through the entire operating temperature range. The plot for tube B 820 had second best ozone conversion efficiency in the same operating temperature range. The conversion efficiencies observed for both Tube A and Tube B represent significant improvement over that of unturbulated configuration, as was presented by the plot for Tube C 830.

EXAMPLE IV

Figure 9:
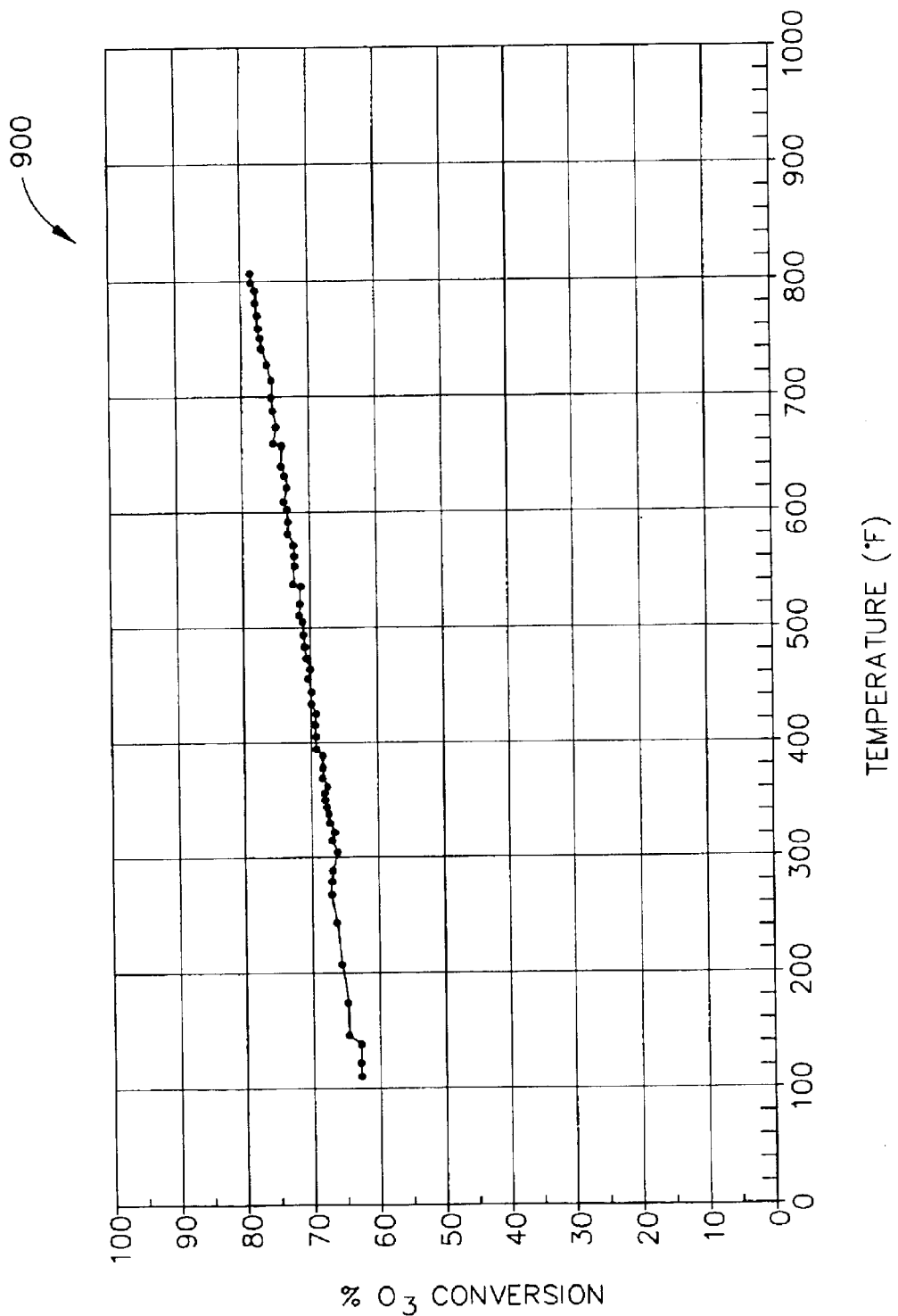

The catalyst slurry was prepared by mixing 30 wt. % of Hopealite fine powder (Carulite 400, Carus Chemical Company), 40% SR 125 synthetic silicone resin (GE Silicones) balanced with toluene. The mixture was then ball milled for two hours before further dilution by additional toluene to form a slurry with viscosity of 40 centipose. The slurry was then used to washcoat the 12" tubes with the same method used in Example II, followed by drying, curing and calcination at 400° C. for two hours in dry air flow. The ozone destruction efficiency of the tube at different temperatures was tested with the test bed described in Example III. The percentage of ozone conversion as a function of increasing temperature was plotted on graph 900 as shown in FIG. 9. Excellent conversion efficiency was observed.

EXAMPLE V

The catalyzed tube used in Example IV was further treated by the caustic etching method. The tube was immersed into 10 wt. % sodium hydroxide solution at 50° C. for 5 minutes, followed by rinsing with deionized water and drying at 100° C. for 30 minutes. The ozone destruction efficiency of the tube was tested again according to the procedure in Example III. The ozone conversion efficiency improved 5 to 10% throughout the test temperature range over the efficiency observed in Example IV.

EXAMPLE VI

Three precooler tubes with same dimensions as that of tube C in example I were coated with the alumina slurry prepared according to directions given in Example II. After curing and calcination, each of the tubes was catalyzed through impregnation method described in Example II in one of the following three catalyst solutions prepared with the respective metal nitrates: 3 wt. % Pd, 6 wt. % Mn, and 6 wt. % Ni (formula 1); 3 wt. % Pd and 12 wt. % Mn (formula 2); and 3 wt. % Pd and 6 wt. % Mn (formula 3). After drying and calcination according to the process described in Example II, the ozone destruction activities of all three tubes were measured at 500° F. for initial performance. Subsequently, each of the tubes was subjected to catalyst contamination during two separate two-hour periods, during which they were exposed to airflow containing 100 ppm $SO_2$ and 100 ppm triethyl phosphate (TEP) in gas phase at 500° F., respectively. The ozone destruction efficiencies after removal of each of the gas phase contaminates was also measured and listed in Table I below. As shown in Table I, the catalytic coating comprised of formula 1 exhibited the best overall performance in resisting gas phase contamination.

TABLE I

Ozone destruction efficiencies after gas phase contamination for the precooler catalyzed with three different formulations.

|  | Initial efficiency | After SO$_3$ poisoning | After TEP poisoning |
|---|---|---|---|
| Formula 1 | 76% | 73% | 67% |
| Formula 2 | 76% | 71% | 66% |
| Formula 3 | 74% | 68% | 67% |

It should be understood, of course, that the foregoing relates to preferred embodiments of the invention and that modifications may be made without departing from the spirit and scope of the invention as set forth in the following claims.

We claim:

1. A tube assembly for cooling, and removing pollutants from, an incoming fluid stream, the tube assembly comprising
    a plurality of tubes, each having a diameter D and further having a central tube axis, an interior surface, an entry end, and an exit end, the entry end disposed to receive the incoming fluid stream;
    a turbulator comprising a plurality of elongate strips, the strips aligned along a turbulator axis and axially inserted through each of the tubes so that the turbulator axis coincides with the central tube axis, each strip having a strip surface, each strip maintained at a constant angular displacement from the adjacent strips, the plurality of strips having a plurality of segments with each segment having a length I, each segment defined by a radially directed cut in each strip at a junction between each segment, each segment having a first end and a second end, the first end of each segment rotated by a twist angle about the turbulator axis with respect to the second end of the segment, each segment rotated by an offset angle about the turbulator axis with respect to an adjacent segment; the ratio of I/D having a value greater than 4.0; and
    a catalytic coating adhering to at least one of the strip and interior surfaces, the catalytic coating having contact with the incoming fluid stream flowing through each of the tubes;
    wherein the offset angle between segments disrupts the laminar flow of the incoming fluid stream along the turbulator, and
    wherein a selected tube has a configuration characteristic that is different from at least one tube in the plurality of tubes, the configuration characteristic chosen from a group consisting of the number of segments, the value of the twist angle, and the value of the offset angle.

2. The tube assembly described in claim 1, wherein the catalytic coating is adhered to an interior surface of each of the tubes.

3. The tube assembly described in claim 1, wherein each of the tubes has a circular cross-sectional area.

4. The tube assembly described in claim 1, wherein each of the tubes has a hexagonal cross-sectional area.

5. The tube assembly described in claim 1, wherein the catalytic coating is adhered to each strip surface of the turbulator.

6. The tube assembly described in claim 1, wherein the offset angle is between 15° and 90°.

7. The tube assembly described in claim 1, wherein each cut terminates a distance from the axis to leave a portion of the strip joining the segments along the axis.

8. The tube assembly described in claim 1, wherein the elongate strip is rectangular.

9. The tube assembly described in claim 1, wherein the turbulator is constructed of aluminum.

10. The tube assembly described in claim 1, wherein the turbulator is constructed of stainless steel.

11. The tube assembly described in claim 1, wherein the turbulator is constructed of titanium.

12. The tube assembly described in claim 1, wherein the turbulator is constructed of a ceramic material.

13. The tube assembly described in claim 1, wherein the catalytic coating comprises at least one oxide selected from the group consisting of manganese oxide and nickel oxide.

14. The tube assembly described in claim 1, wherein the catalytic coating comprises alumina pre-catalyzed with a precious metal.

15. The tube assembly described in claim 1, wherein the catalytic coating comprises $Pt/Al_2O_3$.

16. The tube assembly described in claim 1, wherein the catalytic coating comprises $Pd/Al_2O_3$.

17. The tube assembly described in claim 1, wherein the catalytic coating comprises a trimetallic composition containing Pd, Mn and Ni.

18. The tube assembly described in claim 1, wherein the catalytic coating is on both the inner surface of the tube and the strip surfaces of the turbulator.

19. The tube assembly described in claim 1, wherein the catalytic coating destroys more than 90% of the pollutants contained in the incoming fluid stream.

20. The tube assembly described in claim 1, wherein the catalytic coating is adhered to the strip surfaces and to the inner surface through a wash-coating process, wherein the catalytic coating is chosen from a group consisting of a catalytic metal oxide and a catalytic metal supported by the metal oxide, and wherein the catalytic metal oxide has particle size ranging from 100 to 600 mesh and said metal oxide particles are bonded to the tube surface through a binder.

21. A catalytic precooler for use on an aircraft to receive bleed air from an aircraft engine and deliver conditioned air for use within a cabin area of the aircraft, the precooler comprising
    a bundle of tube assemblies for conditioning the bleed air by cooling the bleed air and for removing pollutants from the bleed air, each tube assembly comprising
    a tube having a diameter D and further having a central tube axis, an inner surface, an entry end, and an exit end, the entry end disposed to receive the bleed air and the exit end disposed to deliver conditioned air;
    a turbulator comprising a plurality of elongate strips, the plurality of strips aligned along a turbulator axis and axially inserted through the tube so that the turbulator axis coincides with the central tube axis, each strip having a strip surface, each strip maintained at a constant angular displacement from adjacent strips, the strips having a plurality of segments with each segment having a length I, each segment defined by a radially directed cut in each strip at a junction between each segment, each segment having a first end and a second end, the first end of each segment rotated by a twist angle about the turbulator axis with respect to the second end of the segment, each segment rotated by an offset angle about the turbulator axis with respect to an adjacent segment; the ratio of I/D having a value greater than 4.0; and a catalytic coating adhering to at least one of the strip and interior surfaces, the catalytic coating having contact with bleed air flowing through the tube;

wherein the offset angle between segments disrupts the laminar flow of the bleed air along the turbulator to allow the catalytic coating to destroy pollutants in the bleed air, and wherein a selected tube assembly of said bundle of tube assemblies has a configuration characteristic that is different from at least one tube assembly of the plurality of tube assemblies, the configuration characteristic chosen from a group consisting of the number of segments, the value of the twist angle, and the value of the offset angle.

22. The catalytic precooler described in claim 36, wherein the bundle of tube assemblies has a receiving end and a delivery end, the entry end of each tube assembly comprising the receiving end, the exit end of each tube assembly comprising the delivery end, the bleed air being directed towards the receiving end so that different bleed air pressures are presented to each entry end of each tube assembly, the bleed air exiting from each exit end having a substantially constant pressure, and the pressure drop between the entry end and the exit end of each tube assembly being controlled by differing turbulator configurations.

23. The catalytic precooler described in claim 21, wherein the plurality of segments are chosen so that the catalytic coating destroys more than 90% of the pollutants contained in the bleed air.

* * * * *